United States Patent [19]
Keluskar

[11] Patent Number: 5,675,313
[45] Date of Patent: Oct. 7, 1997

[54] ALERTNESS DETECTING AND WARNING SYSTEM FOR AUTOMOBILE

[76] Inventor: Atul B. Keluskar, 20 Longview Ave. North Woodmere, New York, N.Y. 11581

[21] Appl. No.: 409,021

[22] Filed: Mar. 23, 1995

[51] Int. Cl.⁶ .................................................. B60Q 1/00
[52] U.S. Cl. ................. 340/425.5; 340/439; 340/576; 340/575; 340/309.15; 180/272; 180/273
[58] Field of Search ............................. 340/425.5, 576, 340/575, 439, 309.15; 180/272, 273

[56] References Cited

U.S. PATENT DOCUMENTS 4,005,398  1/1977  Inoue et al. .......................... 340/576
4,031,527  6/1977  Yanagishama et al. .............. 340/576

Primary Examiner—Thomas Mullen
Assistant Examiner—Daryl L. C. Pope

[57] ABSTRACT

By using subassemblies that can be mounted on the floor of the vehicle or on the brake lever and the accelerator lever a continuously active and quick acting alerting system is developed in which an operator sets a time which is needed to switch over the foot between the accelerator and brake pedals and when operator does not accelerates or apply brakes uses an auxiliary device which can be operated by the same foot to indicate alertness and failure to do so within the set time results in actuating alarming devices. Whenever the accelerator or the brake pedal or the auxiliary device is actuated the timer resets itself. The time set is usually within five seconds.

6 Claims, 4 Drawing Sheets

ALERTNESS DETECTING AND WARNING SYSTEM FOR AUTOMOBILE

BACKGROUND OF THE INVENTION

1. Field of the Invention

The present invention relates to a system to test physical responses and reflexes and mental abilities that are required to operate vehicle safely, and take the corrective actions if operator fails to respond adequetely.

2. Description of the Related Art

A very high number of accidents are caused by the drivers with inadequate physical or mental capabilities to drive vehicle safely. This may be due to lack of sleep, use of alcohol, drugs, various sickness, fatigue or similar reasons. There are many systems or the devices are patented in the past to solve this problem, each has its merits and demerits. some of them are described as follows:

U.S. Pat. Nos. 3,885,540, 3,913,086, 3,918,175 and 4,004,290 requires driver to undergo tests for intoxication before driving the vehicle. It does not protect while vehicle is driven by the operator.

U.S. Pat. No. 3,953,831 includes a switch attached to the head of the operator to detect when the operator sleeps or dozes.

U.S. Pat. No. 3,964,045 requires operator to wear a special handgloves which detects operaters ability and take corrective actions.

U.S. Pat. Nos. 3,611,344, 3,778,116, 3,922,665, 4,234,051, 4,240,071, 4,359,725 and 5,012,226 uses a system which tests the driving abilities of the operator over the period of preset time during which operator must respond in correct manner to reset the time interval. The main disadvantage in all these system are as follows:

1. System does not protect during the time interval, longer the time interval lesser the protection. for example if the interval is set for five minutes then and if the operator loses ability to drive after one minute then any corrective action will be taken only after four minutes which may be too late. Also keeping very short time interval is not practical.

2. Operator has to pay extra attention while driving to either see or listen to the signals sent by the system to alert the operator, that interval is about to expire. This is an additional task the operator has to perform while driving the vehicle.

OBJECTS OF THE INVENTION

It is an object of this invention to provide quick and continuously acting with less operators attention an alertness detecting and warning system for the vehicle.

It is another object that operator does not have to wear any additional devices on his body for the system to operate.

It is another object that the system should be easy to install in the existing and new vehicles.

SUMMARY OF THE INVENTION

While driving a vehicle an operator does one of the following things:

CASE-1: apply acceleration.
CASE-2: apply brakes.
CASE-3: does not apply brakes or acceleration but allow the vehicle to travel with its momentum.
CASE-4: let the vehicle run in automatic speed control mode also commonly known as cruz control.

In the CASE-1 and the CASE-2 the alertness is detected by the relative movement of brake pedal and accelerating pedal with each other. In the CASE-3 the operator apllies a specific amount of force with a specific movement with the same foot that is used to apply brakes as well as accelerator to a specific device. If the operator fails to apply a specific force with specific movement of his foot then a signal is sent to the timing circuit. On the timing circuit an operator presets a time that he or she takes to switch over from one pedal to another which is usually within five seconds. If the operator does not apply acceleration or the brakes he or she fails to apply the specific force with specific movement then after the expiration of the preset time as described earlier warning devices are actuated. In the Case-4 operator either chooses to shut-off the system or applies the specific force with specific movement of the foot to the device as described earlier in the CASE-3.

Figure 1:
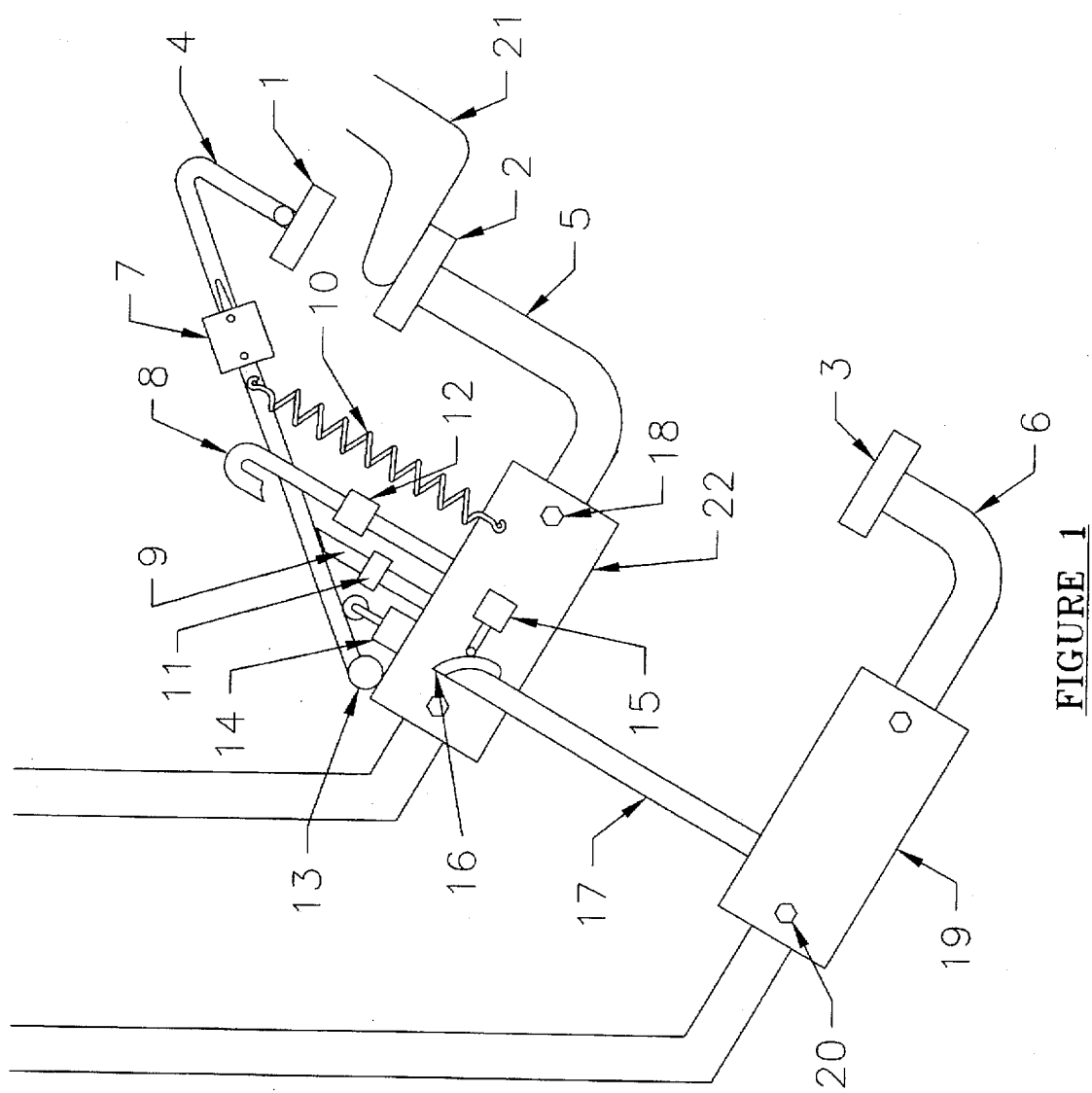
FIG. 1 is a perspective view of various means used in the system.

List of reference numerals utilized in the drawing.

1. Auxiliary pedal
2. Accelerator pedal or accelerating means
3. Brake pedal or braking means
4. Auxiliary pedal arm to operated by specific movement
5. accelerator lever
6. Brake lever
7. Length adjusting strap
8. Top position stop for auxiliary pedal
9. Bottom position stop for auxiliary pedal
10. Extension spring
11. Coupler to adjust item 9 in the figure
12. Coupler to adjust item 8 in the figure
13. Hinge for auxiliary pedal arm
14. Normally On switch with 1N.O+1N.O.contacts
15. Normally On switch with 1 N.O.+1 N.C. contacts
16. Cam to actuate item 15 in the figure
17. Arm for cam
18. Bolts, two on each side
19. Bracket mounted on the brake lever
20. Bolts two on each side
21. Foot of the operator
22. Bracket mounted on the accelerator lever
23. ON/OFF Switch as connecting and disconnecting means
24. Coil of On Time Delay Relay which is a timing means
25. Contacts of On Time Delay Relay closes when preset time is reached
26. Alerting Device as a alerting means also warns others and takes necessary corrective actions
27. Photo electric switch
28. Reflector of photo switch

DETAILED DESCRIPTION OF THE PREFERRED EMBODIMENT

Figure 2:
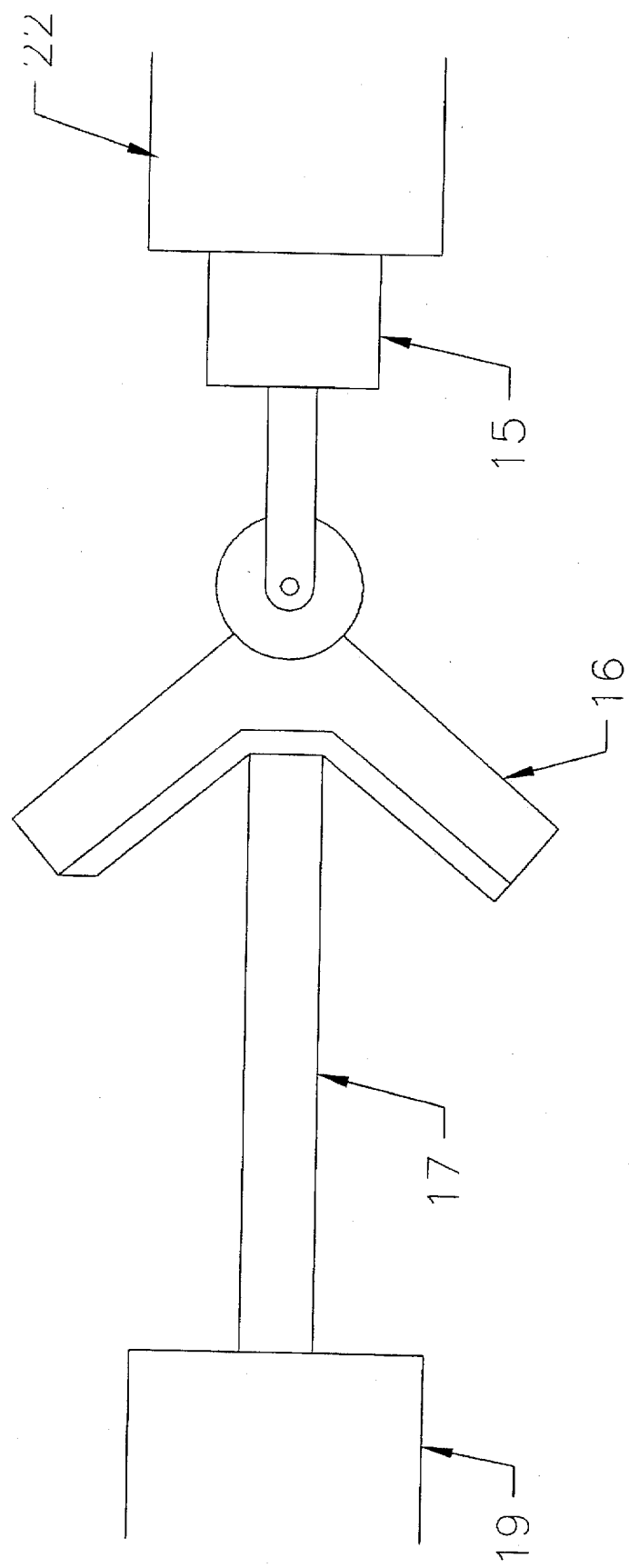
FIG. 2 is a perspective view of the cam and the actuated switch.
Figure 3:
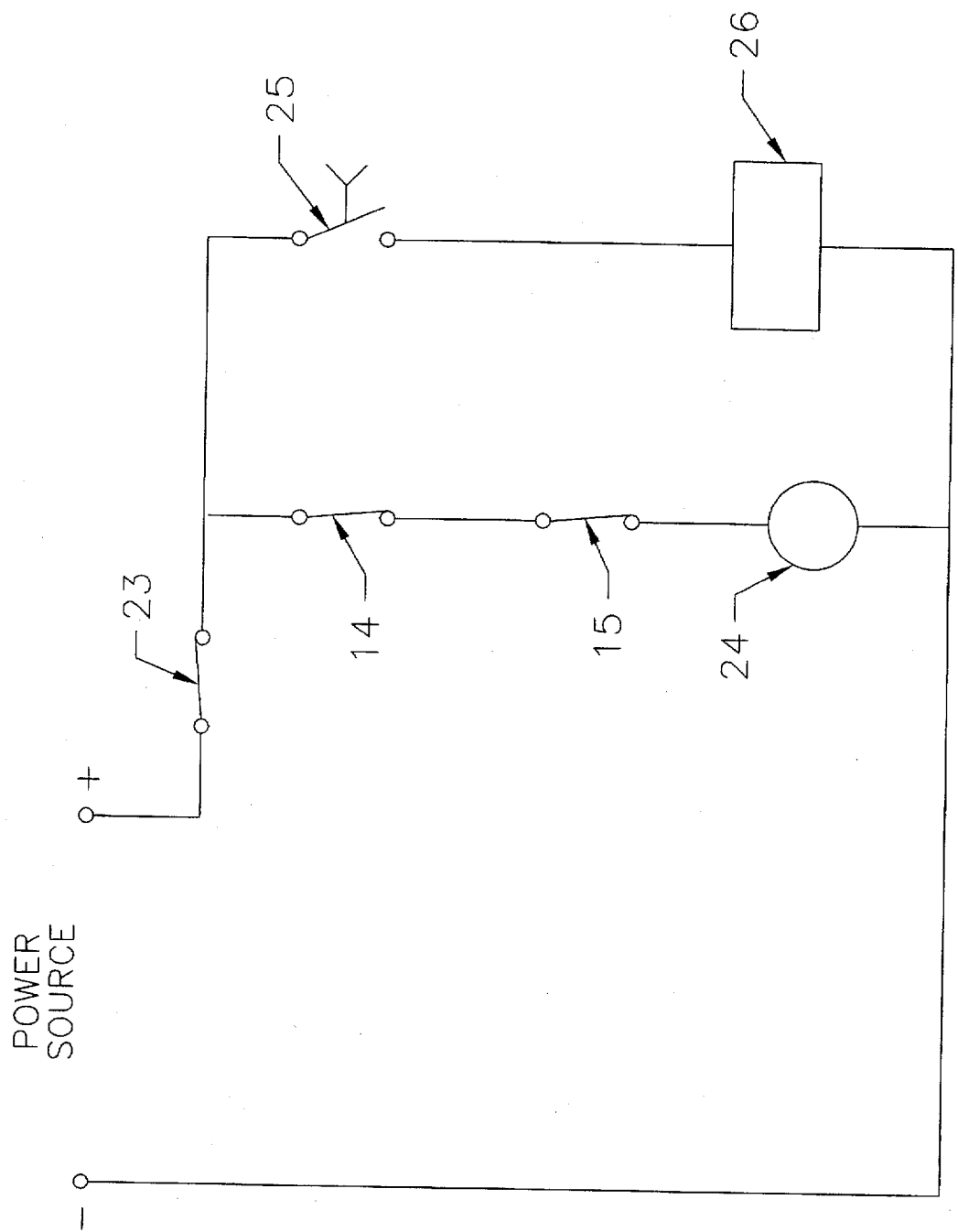
FIG. 3 is a electric cicuit diagram in time counting mode.

FIG. 1, FIG. 2 and FIG. 3 shows preferred embodiments of alertness detecting and warning system which works the following way using electricity as communicating medium and power source for the communicating means:

An operator switch the system ON with switch 23 as shown in FIG. 3, then sets a preset time usually within five seconds on a time delay relay which is a time needed to switch over the foot 21 between accelerator pedal 2 and brake pedal 3. A switch 15 and its bracket 22 is mounted on accelerator lever 5 and is operated by a cam 16 which is attached to the arm 17. This arm is mounted on the brake lever 6. The switch is set such that whenever any of the pedals are depressed for acceleration or for the braking the switch contacts are open or else the switch contacts are closed. The bracket 19 is mounted by the four bolts 20 two on each side. The bracket 22 is mounted by the four bolts 18 two on each side.

An auxiliary pedal 1 is mounted on arm 4 whose length is adjustable by a strap 7 and is located between the accelerator pedal and the brake pedal such that it is moved by placing the foot of the operator up without interfering normal action of switching between the accelerator and brake pedals with the help of coupler 11 on bottom stop 9. Switch 14 is adjusted such that when extension spring 10 pulls arm 4 down around hinge 13 its contacts are held in closed position.

When an operator does not dipress any of the accelerating or braking pedal then operator must place the foot of the operator up to raise the auxiliary pedal 1 and open the contacts of switch 14. In order to know the operator that he or she has achieved this, a top stop 8 which is preset by the coupler 12 is provided. In this situation where no acceleration or brakes are applied and operator failed to raise auxiliary pedal upto the specified position that is top stop thin contacts in switch 14 and the switch 15 are closed as shown in the FIG. 3. This energizes coil 24 of the on time delay relay which starts to count the preset time and if the operator failed to respond during this time the contact 25 on time delay relay will be closed resulting actuating alerting device 26.

Figure 4:
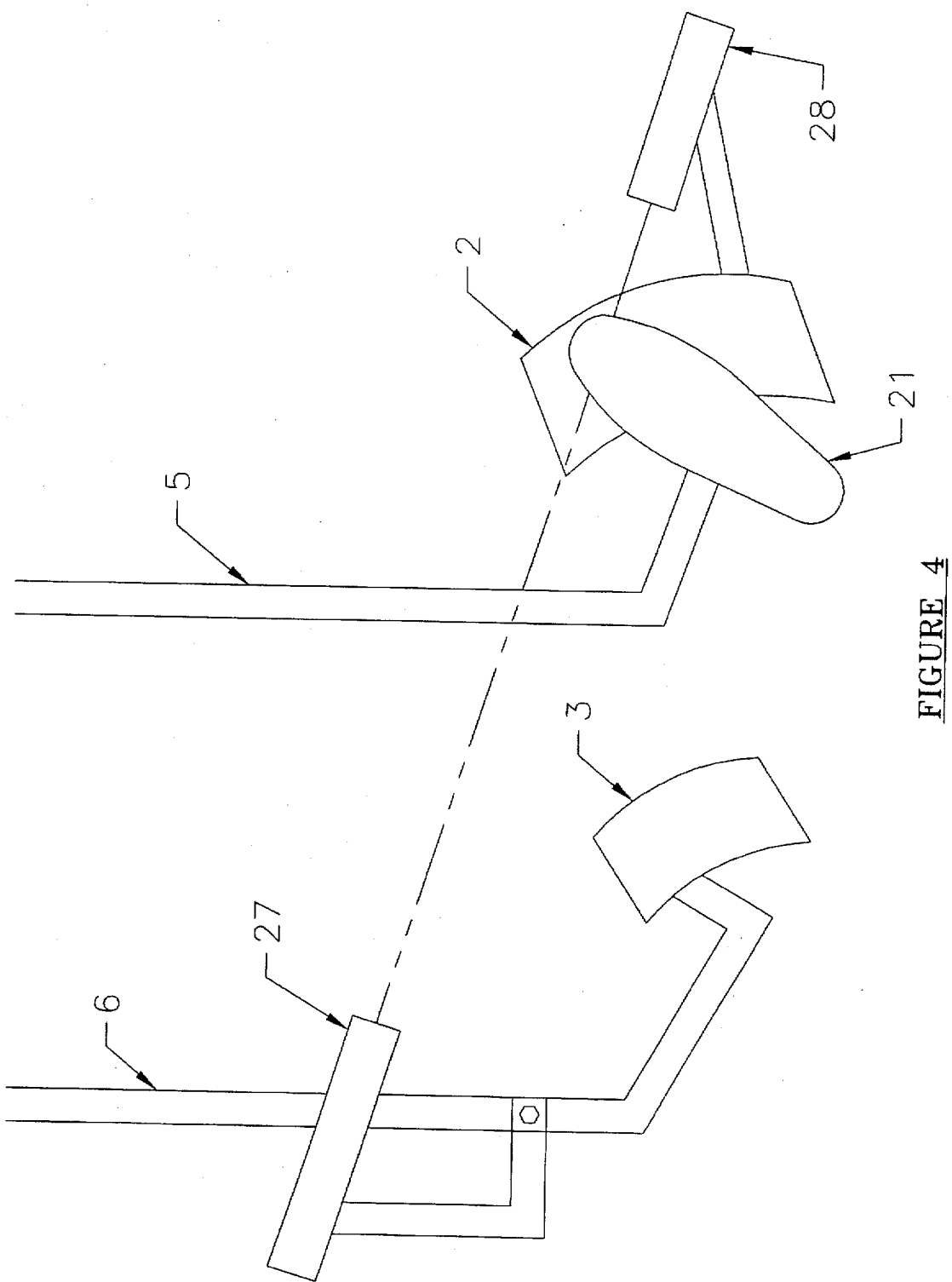
FIG. 4 is a perspective diagram using photo switch assembly.

FIG. 4 shows an alternative arrangement with the help of photo switch 27 and reflector 28 in order to replace switch 14 and 15 in this case photo swich and reflector is so set that the contacts of the switch remains open by doing one of the following things:

1. depressing accelerator for acceleration
2. depressing brakes for braking
3. raising the toe of foot to block the light between photo switch and the reflector thus opening the contacts, failure to do so results in closing the photo switch contact and energizing the coil and further actuating alerting devices after preset time by closing contact 25.

What is claimed is:

1. A safety system for alerting a driver when said driver becomes drowsy while operating a motor vehicle, comprising a photoswitch assembly including a photoswitch and a reflector mounted on a brake pedal and accelerating pedal respectively of said vehicle so that when said driver is alerted emitted light from said photoswitch directed at said reflector is blocked and if said driver fails to block said light then it strikes said reflector and is received by said photoswitch causing said photoswitch to generate a first signal; an on time delay relay which counts time from initial present time as long as said first signal keeps continuously receiving and at a preselected value of time generates a second signal and if said first signal stops generating then said on time delay relay resets itself at said initial present time; and a warning device for giving a warning to said driver when said device receives said second signal.

2. A safety system as described in claim 1 further provided with a switch operated by said driver to connect and disconnect the system.

3. A safety system as described in claim 1 including means to mount said photoswitch on said accelerator pedal and said reflector on said brake pedal.

4. A safety system as described in claim 1 including means to mount said photoswitch on said accelerator pedal and said reflector on said brake pedal; and a switch manually operated by said driver to connect and disconnect the system.

5. A safety system for alerting a driver when said driver becomes drowsy while operating a motor vehicle, comprising a detecting means to compare relative movement with respect to each other of an accelerating pedal and brake pedal of said vehicle, which generates a continuous first signal as long as said relative movement of said pedals falls below a preselected level and stops generating said first signal if said relative movement is restored at said preselected level; a timing means for counting time from initial present time as long as said first signal is generated and generates second signal only if said counted time exceeds a preselected value said timing means generates a second signal and if said counted time does not exceed said preselected value then said initial present time is reset; a warning means for giving a warning to said driver when said second signal is generated.

6. A safety system as described in claim 5 including a switch to connect and disconnect the system.

* * * * *